United States Patent
Korenberg et al.

[19]

[11] Patent Number: 6,005,664
[45] Date of Patent: Dec. 21, 1999

[54] NONUNIFORM SAMPLING FOR SPECTRAL AND RELATED APPLICATIONS

[75] Inventors: Michael J. Korenberg, Battersea, Canada; Colin J. H. Brenan, Marblehead; Ian W. Hunter, Lincoln, both of Mass.

[73] Assignee: Massachusetts Institute of Technology, Cambridge, Mass.

[21] Appl. No.: 09/167,086

[22] Filed: Oct. 6, 1998

Related U.S. Application Data

[60] Provisional application No. 60/061,395, Oct. 7, 1997.

[51] Int. Cl.$^6$ .................................................. G01B 9/02
[52] U.S. Cl. .............................................. 356/346; 356/345
[58] Field of Search ..................................... 356/345, 346

[56] References Cited

U.S. PATENT DOCUMENTS

| | | | |
|---|---|---|---|
| 5,276,636 | 1/1994 | Cohn | 364/822 |
| 5,422,721 | 6/1995 | Ryan | 356/345 |
| 5,541,728 | 7/1996 | Dierking | 356/346 |

FOREIGN PATENT DOCUMENTS

| | | |
|---|---|---|
| 0 795 755 A2 | 9/1997 | European Pat. Off. . |
| 0 822 517 A2 | 2/1998 | European Pat. Off. . |

OTHER PUBLICATIONS

Madsen et al., "Spectral estimation for random sampling using interpolation", *Signal Processing*, vol. 46, pp. 297–313, 1995.

Korenberg, "A Robust Orthogonal Algorithm for System Identification and Time–Series Analysis", *Biological Cybernetics*, vol. 60, pp. 267–276, 1989.

Korenberg, "Raman Spectral Estimation via Fast Orthogonal Search", *Analyst*, vol. 122, pp. 879–882. Sep. 1997.

Brenan et al., "Volumetric Raman Spectral Imaging with a Confocal Raman Microscope: Image Modalities and Applications", Reprinted from Three–Dimensional Microscopy: Image Acquistion and Processing III, *SPIE*, Jan. 30–Feb. 1, 1996.

Marvasti, "Nonuniform Sampling", *Advanced Topics in Shannon Sampling and Interpolation Theory*, 1993.

Korenberg et al., "Orthogonal Approaches to Time–Series Analysis and System Identification", *IEEE*, Jul. 1991.

*Primary Examiner*—Robert H. Kim
*Attorney, Agent, or Firm*—Bromberg & Sunstein LLP

[57] ABSTRACT

A method for deriving a spectrum of a substance in such a manner as to enhance a specified characteristic of the spectrum. Irregular intervals are chosen in the signal domain for sampling the signal. The irregular intervals may be randomly spaced. The signal is sampled at the irregular intervals and transformed into the transform domain through application of a transform algorithm, such as a fast orthogonal search, capable of accommodating an irregularly sampled signal. Interferometric spectrometers having parallel optical paths with irregularly spaced phase delays are provided for the practice of the claimed method.

15 Claims, 6 Drawing Sheets

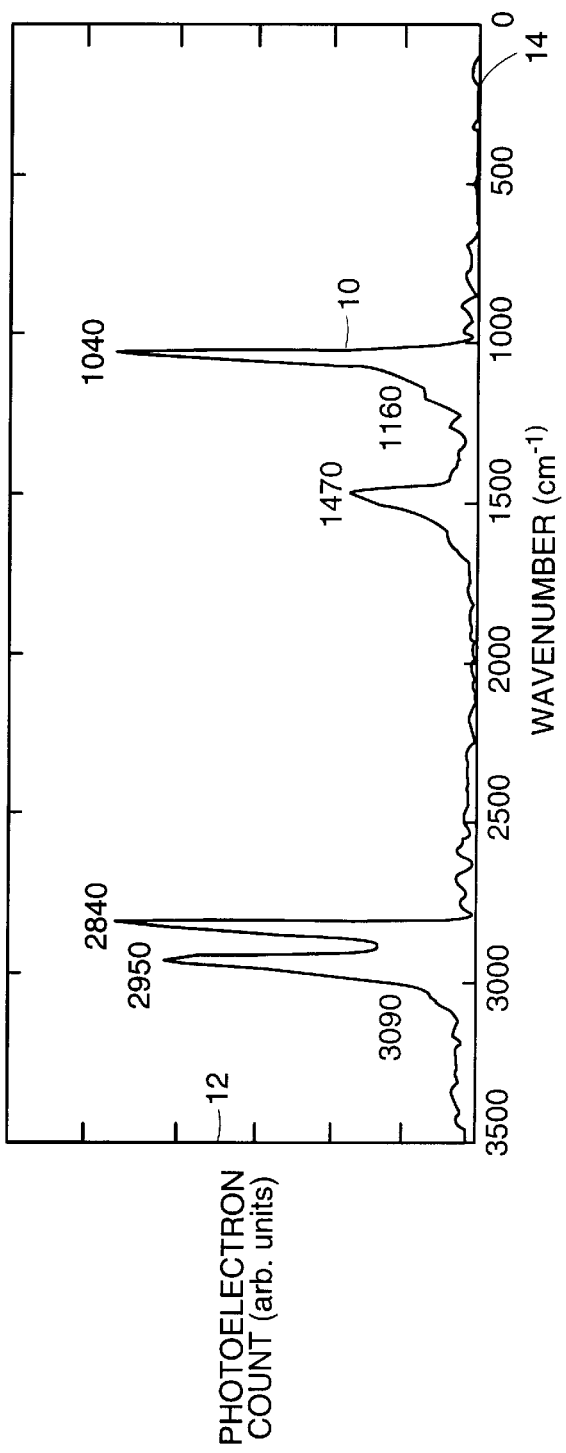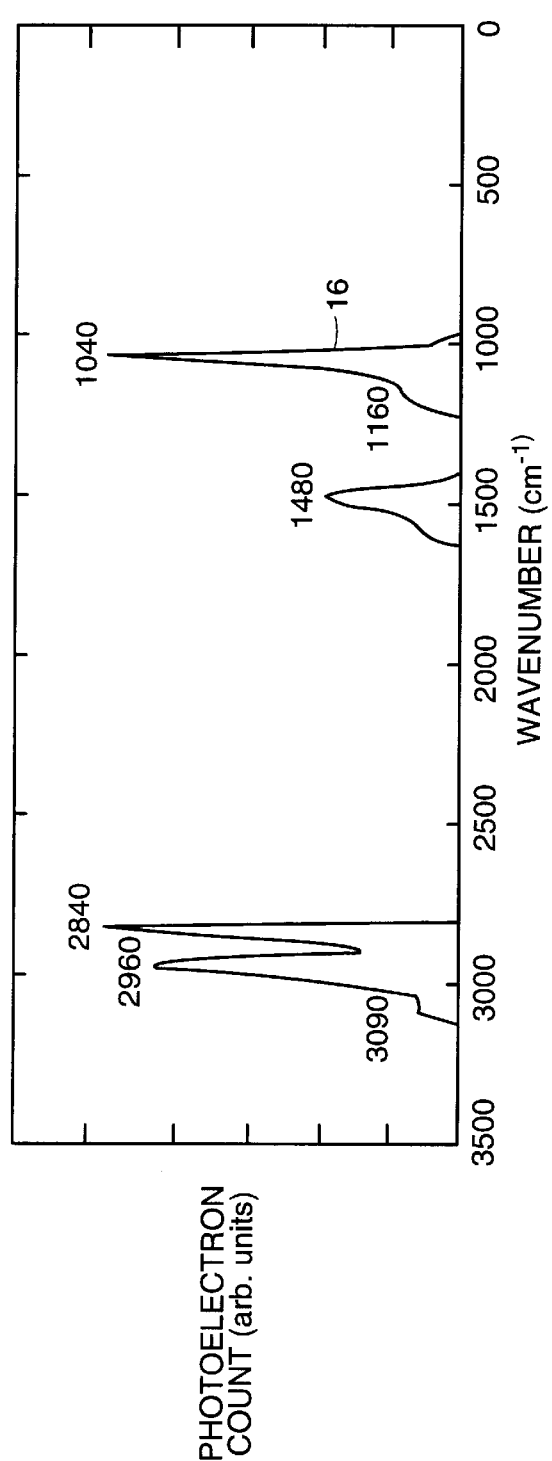

NONUNIFORM SAMPLING FOR SPECTRAL AND RELATED APPLICATIONS

UNIFORM SAMPLING FOR SPECTRAL AND RELATED APPLICATIONS

The present application claims priority from U.S. provisional application No. 60/061,395 filed Oct. 7, 1997, which application is herein incorporated by reference.

TECHNICAL FIELD

The present invention pertains to a device and method for spectral estimation based on sampling a random variable in irregular or random intervals for providing information regarding a transform variable where the information is optimized with respect to one or more desired characteristics.

BACKGROUND OF THE INVENTION

Interferometric spectroscopy is founded on the relationship between the optical phase delay $\Delta\phi$ which a beam of light undergoes on traversing a distance s:

$$\Delta\phi = 2\pi \frac{s}{\lambda} = 2\pi\sigma s, \tag{1}$$

where $\lambda$ is the wavelength of the light, $\sigma$ is the wavenumber, and s is the effective optical pathlength, taking into account the refractive characteristics of the media through which the light is propagated. The spectrum of wavelength components comprising a particular beam of light may yield information regarding the source of the light or the absorption or spectrochemical characteristics of any medium intervening between the light source and a spectrometer. The phase delay is subject to measurement, at least in a relative sense, and thus the spectral content may be derived by measuring $\Delta\phi$ at a plurality of distances s.

In one realization of an interferometric spectrometer (a Michelson interferometer), discussed here for purposes of example only, the light beam is split and caused to traverse two nearly identical paths, differing only by a slight pathlength difference $\Delta s$ that is varied as a periodic function of time. The two beams are then recombined, and detected by a square-law detector sensitive to the product of the electric field amplitudes characterizing the two light beams. The product of the field amplitudes contains constant terms as well as a cross term proportional to the sinusoid of the relative phase delay in the light beam traversing the two paths. The detector signal J is thus a function of the pathlength difference $\Delta s$ which is being varied. The measurement result of detector signal as a function of pathlength difference $J(\Delta s)$ is referred to as an interferogram. The spectral content $B(\sigma)$ may be derived from $J(\Delta s)$ since the relation between s and $\sigma$ is known from Eqn. 1. For a polychromatic field illuminating the interferometer, the interferogram, $J(\Delta s)$, and optical spectrum are a cosine Fourier transform pair, $$J(\Delta s) = \int_{-\infty}^{+\infty} B(\sigma)\cos(2\pi\sigma\Delta s)d\sigma, \tag{2}$$

and the interferogram is formally equivalent to the autocorrelation of the input optical field through the Wiener-Khitnitche theorem. Thus, an equivalent statement of the object of Fourier transform spectroscopy is the application of an interferometer to measure the optical field correlation for recovering the optical power spectrum by application of a transform.

The common practice in optical interferometry is to sample the interferogram at equispaced intervals of path difference. This is often accomplished by scanning path difference $\Delta s$ as a linear function of time and sampling $J(\Delta s)$ at intervals of constant period, however, scans weighted in time but constant in path difference are known in the art. The resulting equally-sampled interferogram is then transformed, using standard discrete Fourier transform (DFT) techniques, producing a spectrum, $B(\sigma)$, the spectral resolution of which is constant across the bandwidth of the derived spectrum. Standard spectroscopic practice is discussed, for example, in Ferraro & Basile (eds.), *Fourier Transform Infrared Spectroscopy: Applications to Chemical Systems*, (Academic Press, 1978), which is incorporated herein by reference.

For a number of reasons, however, uniform sampling is not always optimal. For example, the object of the spectroscopy might be the detection of a particular spectral feature, such that sampling to confirm or exclude the presence of that feature is of greater significance than the absolute calibration of spectral amplitudes with respect to a baseline. In other cases, data acquisition, transmission, or storage might be at a premium, and a reduction in the number of sampled points required to achieve a specified spectral resolution might be desirable, but unattainable using known techniques.

Various methods are known for obtaining a transform of a signal sampled irregularly or randomly. Examples may be found in Marvasti, "Nonuniform Sampling," in Marks (ed.), *Advanced Topics in Shannon Sampling and Interpolation Theory* (Springer-Verlag, 1993), Dowla, *MEM Spectral Analysis for Nonuniformly Sampled Signals*, (MIT, 1981), and Kay, *Modern Spectral Estimation: Theory and Application* (Prentice-Hall, 1988), Korenberg, et al., "Raman Spectral Estimation via Fast Orthogonal Search," in *The Analyst*, vol. 122, (September, 1997), pp. 879–82, and Korenberg, Chapter 7 in *Non-linear Vision: Determination of Neutral Receptive Fields, Function, and Networks*, Pinter & Nabet (eds.), (CRC Press, 1992), all of which are incorporated herein by reference. These methods may obtain frequency resolutions comparable to that obtained with a DFT but with a reduced number of sample points.

Another known method for obtaining a transform of a signal sampled irregularly or randomly applies a fast orthogonal search, as described, in connection with time-series analysis, in Korenberg, "A Robust Orthogonal Algorithm for System Identification and Time-Series Analysis," *Biological Cybernetics*, vol. 60, pp. 267–76 (1989), and in Korenberg & Paarmann, "Orthogonal Approaches to Time-Series Analysis and System Identification,", *IEEE SP Magazine*, (July, 199), pp. 29–43, which are incorporated herein by reference. As discussed in detail in Korenberg & Paarmann, FOS is capable of much liner frequency resolution than a conventional Fourier series analysis, and, moreover, model order is automatically determined and no polynomial equation is required to be solved in performing the transform.

None of the methods discussed, however, provides a method for specifying the sampling intervals for optimizing particular features in the transform domain.

If the objective is particularized information with respect to $R(\tau)$, the autocorrelation of a function u(t), for example, spectral characteristics, it is possible, in accordance with the teachings of the invention, to choose (at least in a statistical sense) the sampling intervals on t over which u(t) is measured so as to optimize the measurement for deriving the requisite properties of $R(\tau)$.

Similarly, the desired characteristics to be ascertained may correspond to higher-order moments.

Spectroscopic methods are known for reducing the time required to obtain a sample resulting in a spectrum, in the transform domain, of specified resolution. For example, spatial mutliplexing may be applied, wherein a Fourier Transform spectrometer is fabricated from a fixed two-beam interferometer and an array of photosensors with equi-spaced detector elements for recording an interferogram spatially distributed across the detector array. For the same signal-to-noise, the acquisition time may be reduced by a factor (the multi-channel advantage) substantially equal to the number of detector elements. The spectral resolution, in this case, is limited by the spatial separation of the detector elements.

SUMMARY OF THE INVENTION

In accordance with a preferred embodiment of the present invention, there is provided a method for enhancing a specified characteristic of a transform of a signal. The method has the steps of choosing irregular intervals in the signal domain for sampling the signal, sampling the signal at the irregular intervals, and transforming the signal into the transform domain. In accordance with alternate embodiments of the invention, the specified characteristic may be a spectral characteristic, and the transform domain and the signal domain may be identical.

In accordance with another aspect of the present invention, there is provided a method for obtaining a spectrum of a substance. The method has the steps of sampling an interferogram of the substance at irregular intervals for obtaining an irregularly sampled interferogram, and transforming the irregularly sampled interferogram into a spectral domain. The step of transforming the irregularly sampled interferogram into a spectral domain may include searching through a set of candidate frequencies for obtaining a sinusoidal series model, and the step of transforming may be performed by means of a fast orthogonal search.

In accordance with yet another aspect of the present invention, there is provided a spectrometer for obtaining an electromagnetic spectrum of a substance. The spectrometer has an input for receiving electromagnetic radiation, and a beamsplitter for splitting the electromagnetic radiation into a first and a second beam, the first and second beams having spatial components. Additionally, the spectrometer has a phase retarder for introducing an phase delay in the first beam relative to the second beam in such a manner that the phase delay is a function of the spatial component of the first and the second beam, and an array of detectors, such that each detector receives a spatial component of the first beam and a spatial component of the second beam. In accordance with an alternate embodiment of the invention, the spectrometer may also have a waveguide for transmitting at least one spatial component of the first beam, and the waveguide may be an optical fiber.

BRIEF DESCRIPTION OF THE DRAWINGS

The invention will be more readily understood by reference to the following description, taken with the accompanying drawings, in which:

FIG. 1a shows a Raman spectrum of methanol resulting from application of the prior-art DFT to a 6294-point equi-sampled interferogram (Hamming windowed and zero-padded to 8191 points);

FIG. 1b shows a Raman spectral estimate of methanol that results from the direct application of FOS to the 6294 point raw interferogram in accordance with an embodiment of the present invention;

FIG. 4b is an end view of the array of dual-fiber Mach-Zehnder interferometers of FIG. 4a;

DETAILED DESCRIPTION OF SPECIFIC EMBODIMENTS

Figure 2A:
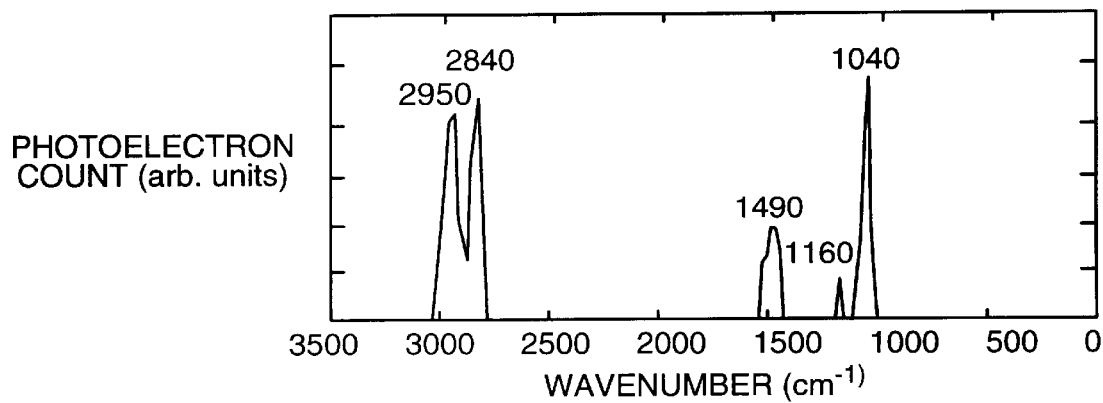
FIG. 2a show a methanol Raman spectral estimate by FOS applied to a 621 point reduced interferogram generated by resampling of a noisy 6294 point interferogram with a random sampling sequence, with the noise variance corresponding to 10% of the interferogram variance.

As discussed above, it is frequently advantageous to obtain specified information in the transform domain of a sampled signal. Such information may include the amplitude of a particular spectral component, or the relative amplitudes of distinct spectral components. Additionally, the characteristics to be ascertained may correspond to the correlation of a plurality of variables, the optimal sampling of each of which is taught by the present invention. Thus, given the desired characteristics of a transform of a moment of variables $u(t)$ and $v(t)$, which are both variables of independent variable t, this invention teaches how $u(t)$ and $v(t)$ are to be sampled on the t continuum in order to provide an efficient determination of the desired characteristics of the transform of the moment.

Under certain circumstances, a transform-domain representation of a variable, such as an optical interferogram, might preferably be cast not in terms of a uniform spectral model but, for example, in terms of a parsimonious sinusoidal series approximation, or otherwise, in order to optimize the desired information content derived during a measurement of finite duration. The advantage of optimizing the desired information content in the transform-domain representation may be achieved, in accordance with an embodiment of the present invention, by choosing sampling intervals in the signal domain which are irregular, stochastic, or both, as described below.

The ability of FOS to cope with unequally spaced data enables irregular sampling of the interferogram and, furthermore, the irregular sampling permits accurate resolution of high frequencies in the optical spectrum using fewer interferogram points than required by the DFT and some other parametric spectral estimators. This can be understood through consideration of a time series obtained by sampling at the Nyquist frequency. Suppose that a large number of data points are randomly deleted. Since some points still remain closely proximate, high frequency information is preserved, yet far fewer points would be required for processing the time series to extract its spectral content. As noted, this exploits the capability of FOS to accept unequally spaced data without introducing error, unlike other spectral methods. Why FOS has this ability is explained in the following discussion.

Denoting irregularly-spaced data points by y(n), respectively sampled at times t=t(n), n=0, . . . , N−1, FOS enables building up a concise sinusoidal series model $$y(n) = \sum_{m=0}^{M} a_m p_m(n) + e(n), \quad (3)$$

where $p_0(n)=1$, and for i=1, 2, . . .

$$p_{2i-1}(n) = \cos \omega_i t(n)$$
$$p_{2i}(n) = \sin \omega_i t(n), \quad (4)$$

and e(n) is the equation error.

The frequencies $\omega_i$ are found by systematically searching through a candidate set of frequencies $\omega_A$, $\omega_B$, . . . These candidate frequencies are not required to be commensurate, nor integral multiples of the fundamental frequency corresponding to the record length. The candidate frequencies can be selected with a priori knowledge of specific frequencies sought or they could simply be frequencies distributed in frequency bands of interest.

In particular, for i=1, 2, . . . , and M=2i we set $\omega_i$ equal to that candidate frequency resulting in the greatest reduction in mean-square error (MSE) when the term pair, $$T_i(n) = a_{2i-1} p_{2i-1}(n) + a_{2i} p_{2i}(n), \quad (5)$$

is added to the model y(n). An implicit orthogonalization of the term pairs, achieved via a slightly-modified Cholesky decomposition, may be used to obtain a computationally-efficient procedure for building up the sinusoidal series model, as discussed in Korenberg. Because the t(n) at which $p_m$ are evaluated are the actual instants when the samples y(n) were taken and since these instants are used in defining the $T_i(n)$ (which are implicitly orthogonalized), the unequal spacing of the data contributes no error. It will be apparent to persons of ordinary skill in the mathematical arts that a number of variations are possible within the scope of the appended claims. For example, frequencies $\omega_i$ may be chosen, or, alternatively, the model may be forced to contain certain frequencies, with remaining frequencies, if any, to be chosen by the algorithm. Additionally, it is not required that the model contain a constant term as assumed above.

An example of the application of FOS spectral estimates is now discussed with reference to FIGS. 1–2. Referring first to FIG. 1a, a Raman spectrum of neat methanol is shown as obtained using prior-art DFT methods. In particular, a double-sided Raman interferogram was obtained by sampling at equi-spaced mirror positions with a conventional Raman spectrometer to yield an interferogram containing 6294 points, which was then Hamming windowed and zero padded to 8192 points. Application of a prior-art DFT yields the Raman spectrum 10 of FIG. 1a, having a spectral resolution of 26 cm$^{-1}$. Divisions on the vertical axis 12 are proportional to the photoelectron count and the horizontal axis 14 indicates spectral position in wavenumbers.

Application of FOS techniques to the raw 6294-point interferogram, in accordance with an embodiment of the present invention, as described above, yields the Raman spectrum 16 shown in FIG. 1b, in which the same spectral features appear as in the DFT spectrum of FIG. 1a, however the spectral resolution obtained is higher, more particularly, 20 cm$^{-1}$. To obtain the Raman spectral estimate of FIG. 1b, the FOS algorithm searched through 200 candidate frequencies equi-spaced between −348 and 500 cm$^{-1}$.

Figure 2B:
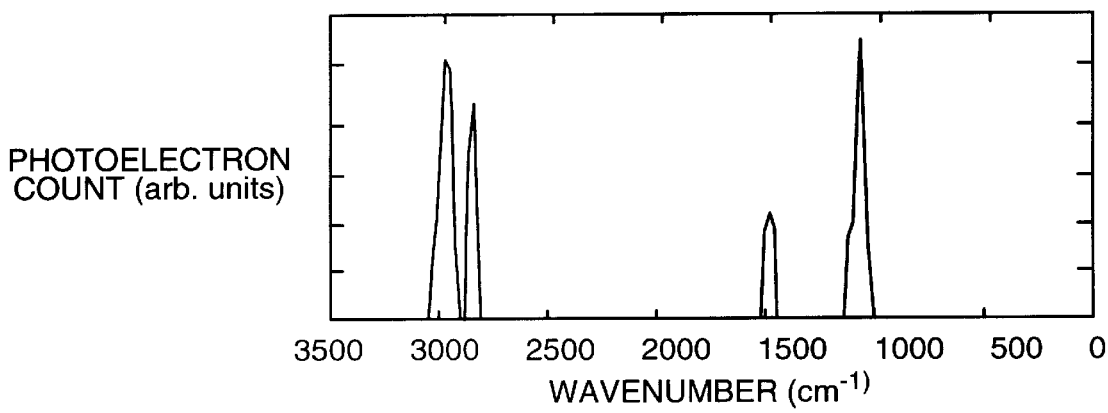
FIG. 2b shows the methanol Raman spectral estimate as in FIG. 2a, with the noise variance corresponding to 5% of the interferogram variance.
Figure 2C:
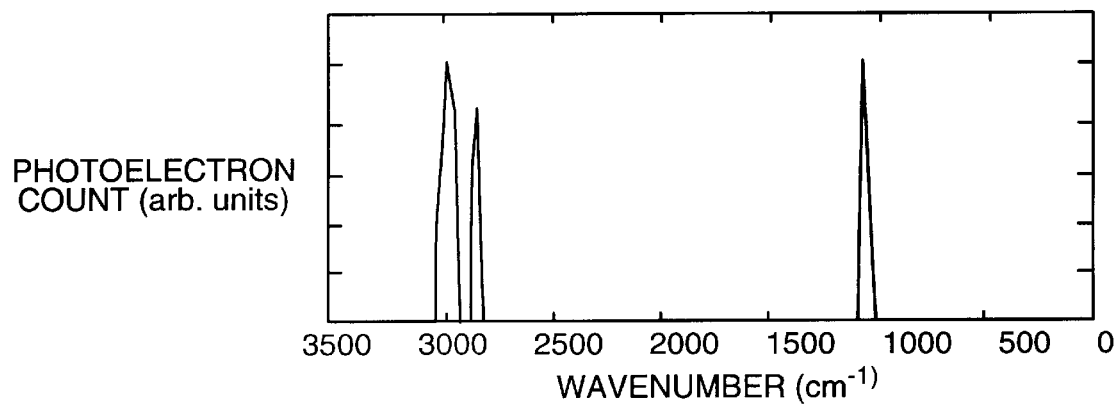
FIG. 2c shows the methanol Raman spectral estimate as in FIG. 2a, with the noise variance corresponding to 100% of the interferogram variance.

Referring now to FIG. 2a, the same Raman interferogram, discussed with reference to FIG. 1, was contaminated with zero-mean white Gaussian noise having a variance equal to 10% of that of the interferogram. Then, 621 of the original 6294 points in the noisy interferogram were randomly selected, and FOS was directly applied without any additional processing to this reduced data set. Comparison of FIG. 2a with 1a shows that the Raman spectrum estimated from 1% of the noisy data using FOS is similar to the DFT result obtained with 6294 equi-spaced data points. FIGS. 2b and 2c show Raman spectra obtained using FOS techniques applied to the same 621 point irregular sampling sequence for 50% and 100% noise contamination, respectively. The number of frequencies chosen for the FOS transform of FIGS. 2a–c, was determined automatically as described in Korenberg (1997).

Thus, in accordance with a preferred embodiment of the invention, in order to achieve a specified spectral resolution. for example, a random sample of fewer data points than would be required for a DFT may be obtained, and transformed via FOS to obtain the requisite spectrum. It may be shown empirically that, in many cases, the major spectral components in a Raman spectrum from a randomly-reduced interferogram, as transformed via FOS, is substantially independent on the particular random sampling sequence employed.

Alternatively, an irregular sampling sequence may be tailored to obtain desired information in the transform domain. For one example, in some applications it may be desirable to detect or exclude the presence of a spectral feature at a frequency $\sigma_1$, where it is known that a potentially obscuring feature occurs at frequency $\sigma_2$. There may be limitations on the number of sampling points that may be obtained. Methods for deriving an optimal sampling strategy are known to persons of ordinary skill in the mathematical arts. For example, standard Monte Carlo techniques may be applied to optimize the ability to discriminate, by minimizing the MSE, among model sets of coefficients $\{a_m\}$ and/or frequencies $\omega_i$ of Eqns. (3) and (4) for a specified order of the model or for an order which can be automatically determined using a mathematical criterion. Similar techniques may be applied for optimizing detection of a spectral feature at a frequency $\sigma_1$, where the fractional spectral width of the feature is believed to be of order $\Delta\sigma/\sigma$, and the noise is believed to have Gaussian or other known characteristics. In order to determine a linewidth, without regard to the location on the spectral continuum of a feature, it might be advantageous to differentially weight the fraction of sampling intervals chosen at large pathlength difference $\Delta s$ relative to the fraction of measurements at small pathlength difference.

It is to be understood that the use of the terms "signal domain" and "transform domain," in this description and in any appended claims, is without limitation as to the dimensionality of the respective domains.

Figure 3:
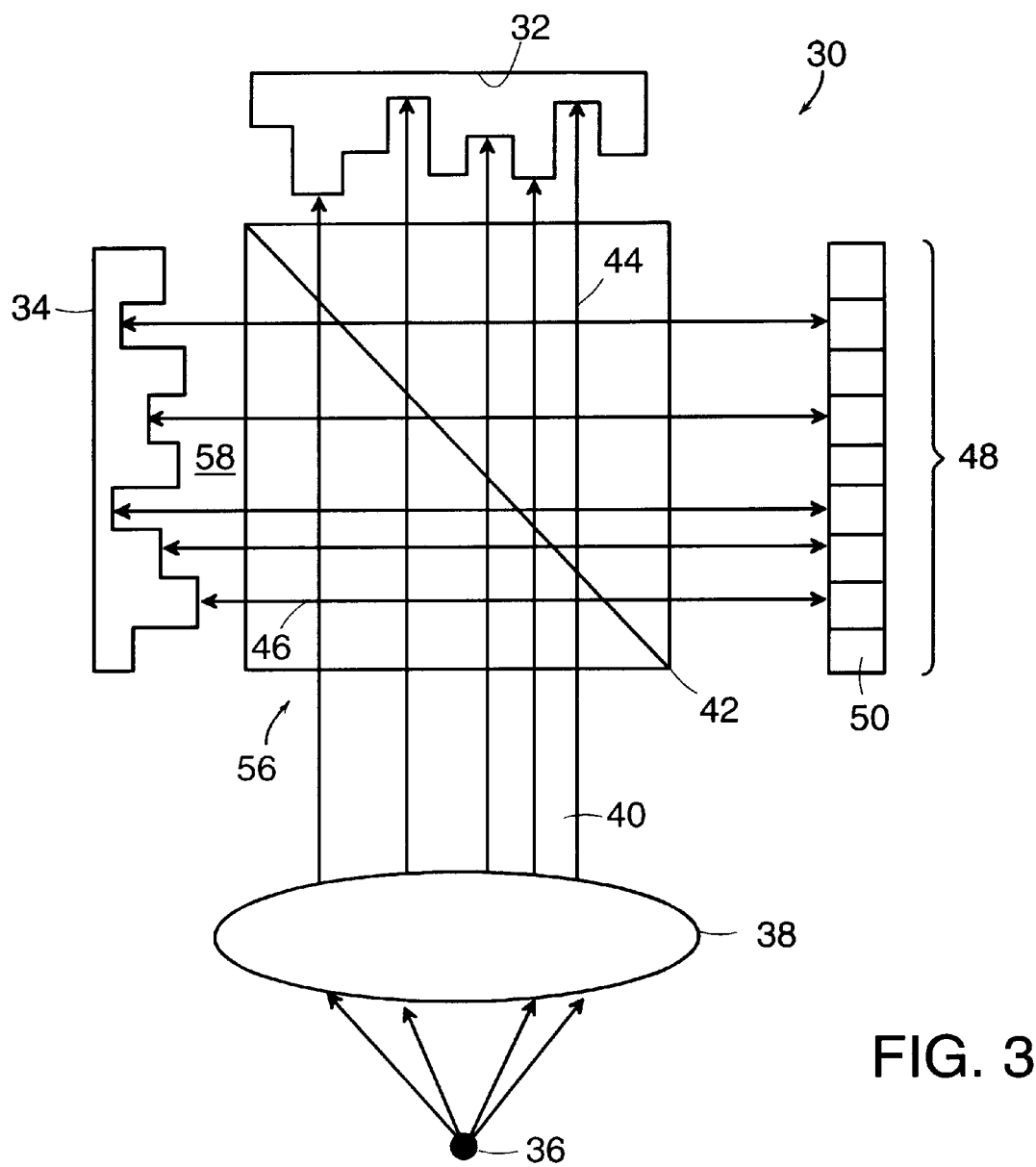
FIG. 3 shows a Michelson-type optical interferometer employing step-etched mirrors to achieve nonuniform optical pathlength sampling in accordance with an embodiment of the present invention.

Referring now to FIGS. 3–6, the method described above for selecting random or other irregular sampling intervals for subsequent FOS transformation may be practiced by means of dedicated spectrometers. FIG. 3 shows the design of a static Michelson interferometer 30 with the distinction that optical path delays are a function of position across mirrors 32 and 34 in a known irregular sequence, which may be a random or quasi-random sequence. A source of light 36 which may, for example, be emergent from a substance to be analyzed, is collimated using collimating optics 38, which may include refractive and/or reflecting optics, as well known in the optical arts. Collimated beam 40 is incident upon beamsplitter 42 which divides the beam into a transmitted beam 44 and a reflected beam 46 which may be of substantially equal intensity as transmitted beam 44 but is not required to be, within the scope of the invention. Beams 44 and 46 are incident on mirrors 32 and 34 respectively, and, after reflection, are recombined by beamsplitter 42 so as to interfere at the plane of detector array 48. Photodetectors 50 comprising detector array 48 are square-law detectors so that the optical fields generate a signal functionally related to the optical phase difference between the two beams, as described above. In order that the optical path differences corresponding to portions of the beam incident on respective photodetectors 50 of array 48 differ by specified irregular intervals, one or both of mirrors 32 and 34 are etched so as to provide parallel but non-coplanar reflecting surfaces 52 and 54.

Other techniques known in the optical arts for achieving irregularly spaced optical path differences for distinct portions of the optical beam are within the scope of the present invention. For example, a step-graduated transmissive phase plate may be inserted within one or both of the arms of the interferometer. The reflecting surfaces 32 and 34 may also be fabricated directly on an optical block 56 containing beamsplitter 42, by etching the outer surfaces 58 and depositing a reflecting material such as gold. Fabrication of stair-case configured optics, such as reflecting surfaces 32 and 34 is well-known in the optical arts, and achieved by various etching or milling techniques.

Figure 4B:
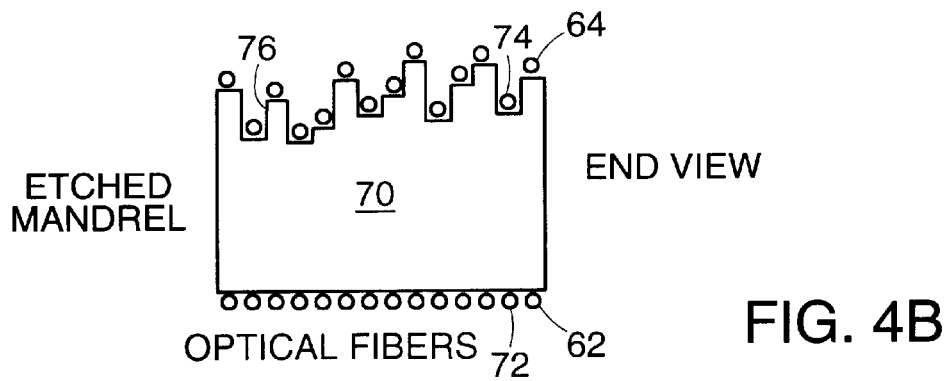
Figure 4A:
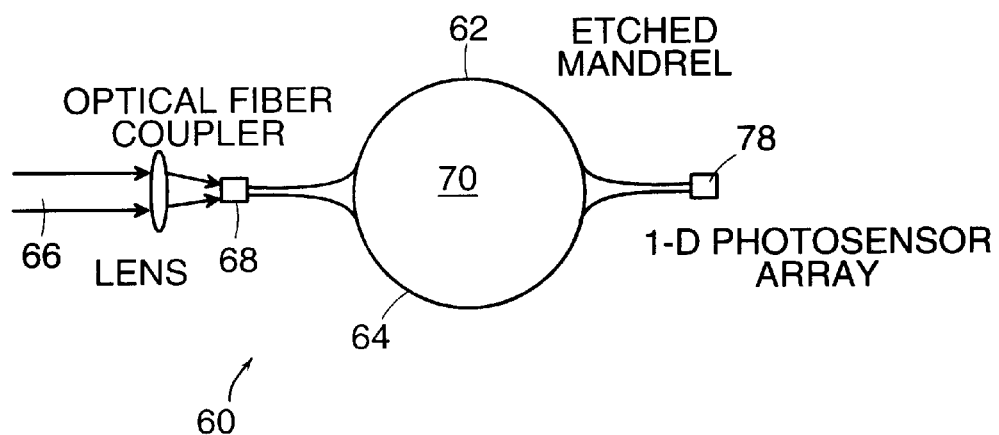
FIG. 4a shows a side view of an array of dual-fiber Mach-Zehnder interferometers for irregularly sampling optical spectrum, in accordance with an embodiment of the present invention.

Referring now to FIG. 4a, an alternative embodiment of the present invention is shown in which a Mach-Zehnder interferometer, designated generally by numeral 60, is implemented by pairs of optical fibers 62 and 64 forming alternate paths of light 66 coupled, via optical coupler 68 into the respective fibers. Pairs of optical fibers 62 and 64 are wrapped around mandrel 7 in such a manner that the optical path difference Δs between light traversing fiber 62 and fiber 64 differs among the various fiber pairs. FIG. 4b shows an end view of Mach-Zehnder interferometer 61, showing that optical fiber pair 62/64 are of a different relative length than optical fiber pair 72/74 by virtue of lying on a different portion of etched surface 76 of mandrel 70. Beams traversing the respective path pairs are recombined onto a one-dimensional linear array of photodetectors 78, as shown in FIG. 4a.

Figure 5:
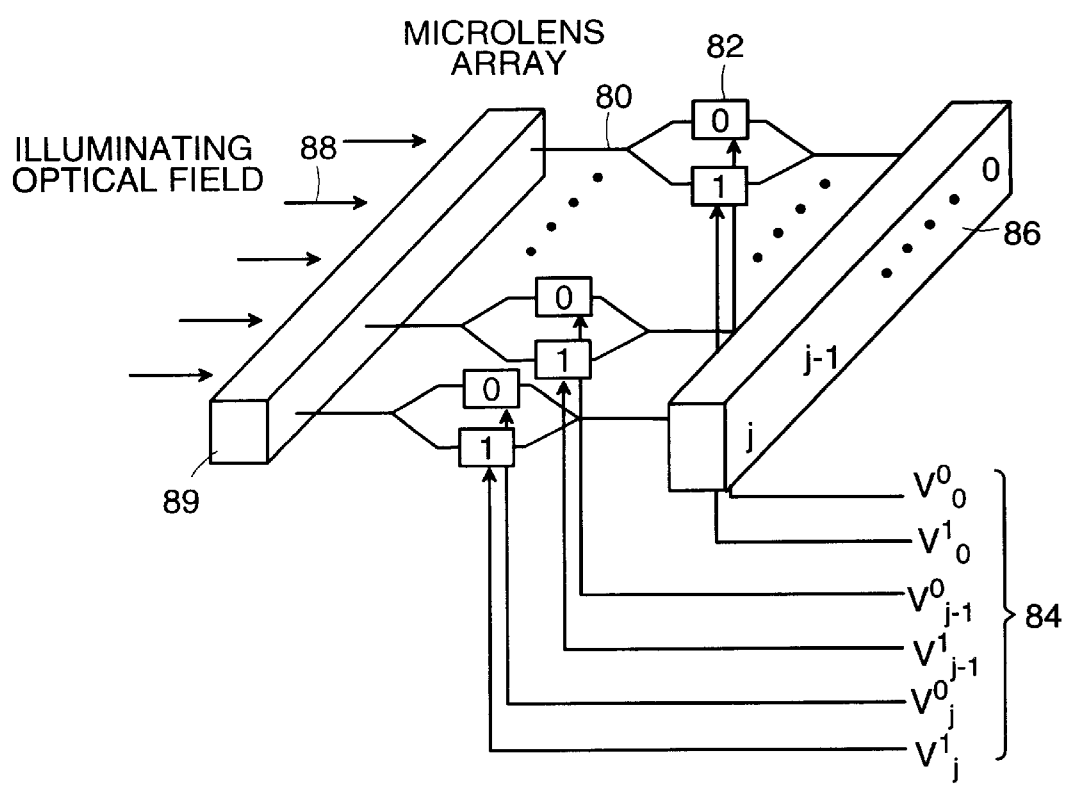
FIG. 5 is a schematic view of an integrated optic array of Mach-Zehnder interferometers having electronically addressable phase shifting modulators.

In accordance with an alternate embodiment of the invention, an array of Mach-Zehnder interferometers may be implemented as integrated optic Mach-Zehnder interferometers, as shown in FIG. 5. The optical delay in each interferometer 80 is determined by one or two optical phase modulators 82, each corresponding to an arm of the interferometer and designated respectively "1" and "1'". Phase modulators 82 may be electro-optical cells, in which case the phase difference is selected electronically by application of electrical inputs 84. An optical delay may be imposed on each interferometer from a known but random sequence and a fast orthogonal search algorithm may be applied to the resulting interference pattern recorded by an array sensor 86, such that the spectral content of input optical field 88 may be estimated. Input field 88 may be coupled to the array of interferometers 80 by a coupling element such as a microlens array 89, as known in the optical art. The integrated optical Mach-Zehnder array may advantageously allow interferogram sampling to be readily modified so as to optimize the interferometer sampling sequence.

Figure 6:
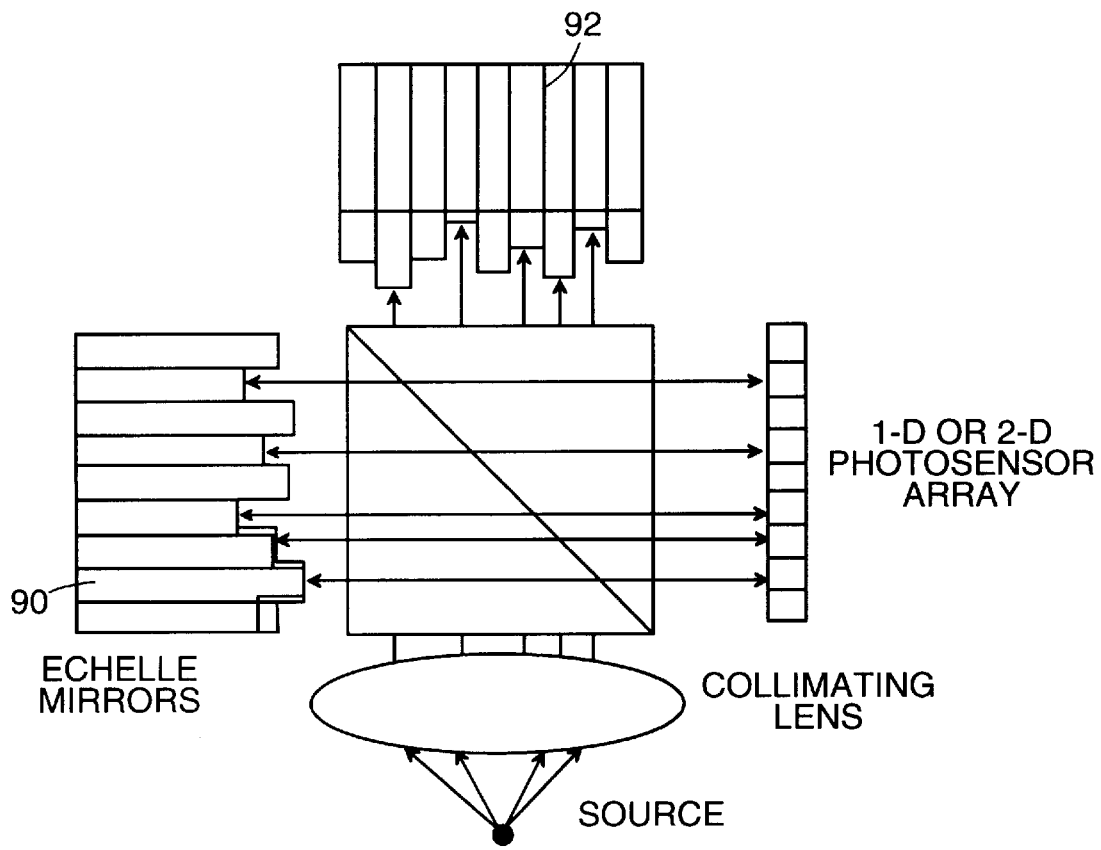
FIG. 6 is an optical interferometer employing echelle mirrors to achieve nonuniform optical pathlength sampling in accordance with an embodiment of the present invention.

A further alternate embodiment of the invention is depicted in FIG. 6, where differential path delay is provided by echelle mirrors 90 and 92. All of the spectrometer designs described may be advantageously made compact because the number of distinct optical lags required to generate a FOS spectrum may be reduced with respect to that required for a DFT spectrum.

It will be evident to persons of ordinary skill in spectral analysis that the techniques described herein are applicable, not only to interferometric spectroscopy (optical, infrared, atomic beam, etc.), but to all manner of applications wherein one variable is measured in order to estimate its power spectrum or characteristics of its autocorrelation function. Such applications may include seismography and imaging.

While the invention has been described in detail, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A method for enhancing a specified characteristic of a transform of a signal in a signal domain, the transform of the signal being in a transform domain, the method comprising:
    a. choosing irregular intervals in the signal domain for sampling the signal;
    b. sampling the signal at the irregular intervals; and
    c. transforming the signal into the transform domain without interpolating regularly spaced values in the signal domain.

2. A method according to claim 1, wherein the specified characteristic is a spectral characteristic.

3. A method according to claim 1, wherein the transform domain and the signal domain are identical.

4. A method for obtaining a spectrum of a substance, the method comprising:
    a. sampling an interferogram of the substance at irregular intervals for obtaining an irregularly sampled interferogram; and
    b. transforming the irregularly sampled interferogram into a spectral domain without interpolating regularly spaced values in the signal domain.

5. A method according to claim 4, wherein the step of transforming the irregularly sampled interferogram into a spectral domain includes searching through a set of candidate frequencies for obtaining a sinusoidal series model.

6. A method according to claim 4, wherein the step of transforming is performed by means of a fast orthogonal search.

7. A method for deriving specified characteristics of a desired transform of a correlation function of a specified moment with respect to at least one random variable, the method comprising:
    a. determining an optimized sampling strategy based on the specific characteristics to be determined;
    b. sampling of the random variable according to the optimized sampling strategy for obtaining discrete and irregularly spaced samples of the random variable; and
    c. transforming the samples of the random variable into a transform domain for obtaining the desired transform of the correlation function without interpolating regularly spaced values in the signal domain.

8. A spectrometer for obtaining an electromagnetic spectrum of a substance, the spectrometer comprising:
   a. an input for receiving electromagnetic radiation;
   b. a beamsplitter for splitting the electromagnetic radiation into a first and a second beam, the first and second beams having irregularly spaced spatial components;
   c. a phase retarder for introducing an phase delay in the first beam relative to the second beam in such a manner that the phase delay is a function of the irregularly spaced spatial component of the first and the second beam; and
   d. an array of detectors, such that each detector receives a spatial component of the first beam and a spatial component of the second beam.

9. A spectrometer according to claim 8, further including a waveguide for transmitting at least one spatial component of the first beam.

10. A spectrometer according to claim 9, wherein the waveguide is an optical fiber.

11. A spectrometer according to claim 8, wherein each detector is a photodetector.

12. A spectrometer according to claim 8, wherein the phase retarder is a step optical retarder.

13. A spectrometer according to claim 8, wherein the phase delay is based upon an irregular sampling strategy.

14. A spectrometer according to claim 8, further including a processor for searching through a set of candidate frequencies for obtaining a sinusoidal series model.

15. A spectrometer for obtaining an electromagnetic spectrum of a substance, the spectrometer comprising:
   a. an input for receiving electromagnetic radiation;
   b. a beamsplitter for splitting the electromagnetic radiation into a first set of beams and a second set of beams;
   c. a plurality of phase retarders for introducing irregularly spaced phase delays in the first set of beams relative to the second set of beams in such a manner that the phase delays differ among the first set of beams and among the second set of beams; and
   d. an array of detectors, such that each detector receives a spatial component of the first beam and a spatial component of the second beam.

* * * * *

UNITED STATES PATENT AND TRADEMARK OFFICE
CERTIFICATE OF CORRECTION

PATENT NO. : 6,005,664

DATED : December 21, 1999

INVENTOR(S) : Korenberg et al

It is certified that error appears in the above-identified patent and that said Letters Patent is hereby corrected as shown below:

Col. 9, line 10, change "component" to --components --

Signed and Sealed this

Twenty-fifth Day of July, 2000

Attest:

Q. TODD DICKINSON

*Attesting Officer*     *Director of Patents and Trademarks*